Oct. 20, 1970  W. DUCHATEAU ET AL  3,535,022
ELECTROSTATIC VARIABLE LIGHT REFLECTING ARRANGEMENT
Filed July 11, 1966  2 Sheets-Sheet 1

INVENTORS
Willy Duchateau &
Albert Servais

BY Spencer & Kaye

ATTORNEYS

United States Patent Office 3,535,022
Patented Oct. 20, 1970

3,535,022
ELECTROSTATIC VARIABLE LIGHT REFLECTING ARRANGEMENT
Willy Duchateau, Couillet, and Albert Servais, Gosselies, Belgium, assignors to Glaverbel S.A., Brussels, Belgium
Filed July 11, 1966, Ser. No. 564,419
Claims priority, application Luxembourg, July 12, 1965, 49,043
Int. Cl. G02f 1/28
U.S. Cl. 350—160
16 Claims

ABSTRACT OF THE DISCLOSURE

A light transmitting arrangement having a light transmitting substrate and a layer thereon whose light reflecting properties are varied by varying the strength of an electrostatic field at a right angle to the surface of the layer, the layer being a metal or a semiconductor material.

---

The present invention relates generally to light-reflecting and to light-transmitting materials, especially glass, and to articles incorporating such materials, and more particularly to glazing units.

In recent years buildings have been provided with increasing amounts of glazing in the external walls thereof. This tendency has stimulated considerable interest in the possibility of providing glazing units with light-transmitting properties which can be reversibly modified to maintain comfortable light or temperature conditions notwithstanding changing external conditions of light and/or temperature.

This interest has resulted in various proposals to incorporate into glazing units, substances which transmit incident light radiation to an extent which varies with changes in the prevailing light and temperature conditions. Substances which have been proposed, for this purpose, to be incorporated into a coating layer or between light-transmitting sheets or actually into a vitreous matrix fall into the categories of photochromes, thermochromes, sols, gels, and crystallites.

All of the prior art proposals are based on the idea of reversibly modifying the light absorption by the light-transmitting material or article and all of the types of substances above referred to influence the light transmittance by absorbing a greater or lesser amount of light radiation depending upon the intensity of the incident radiation to which they are exposed.

It is a main object of the invention to provide an arrangement for quickly reversibly modifying the amount of light which can be transmitted through a light-transmitting unit.

It is another object of the present invention to provide an arrangement whose light reflection properties can be changed instantaneously.

Another object is to provide a construction which utilizes an electrostatic field to temporarily change the light reflecting properties of glass, for example.

A further object is to provide such a construction in which the influence of the electrostatic field does not weaken in the course of time.

These objects and others ancillary thereto are accomplished in accordance with preferred embodiments of the invention wherein a method of variably transmitting light is provided and such a method is based on a different principle from that utilized in the prior art proposals. The light flux transmitted from a given source to a given place is varied in course of time wholly or mainly by reversibly modifying the light-reflecting property of at least one light-transmitting layer located between such source and place.

The term "layer" as used herein is intended broadly to denote both self-supporting layers or sheets and coating layers, i.e., layers applied to form coatings on or between sheets.

The term "light-reflecting layer" where hereafter used denotes (unless otherwise stated) a layer which is capable of transmitting light and of which the light-reflecting property can be reversibly modified.

The use of a light-reflecting layer constituted so that a change in its light-reflecting property is accompanied by some change in its light-absorbing property is not excluded, but preferably the changes in the light-transmittance of such layer are due entirely or substantially entirely to a change in the light-reflectance.

When using materials previously proposed an appreciable decrease in the light transmittance is necessarily accompanied by a rise in the temperature of the material since the absorbed radiation is converted into heat. For example, it is well known that the temperature of "athermanous" glass rises by tens of degrees, on exposure to strong sunlight. The heat so generated is largely radiated from the glass and this obviously adversely affects the efficiency with which glass can maintain a comfortable temperature in a room exposed to strong sunlight. A glazing unit functioning according to the present invention affords a considerable improvement in this respect.

It has been found that a wide variety of materials which can be used to form or which are incorporated into light-transmitting layers can be made to reflect incident light to a variable extent under the influence of variations in the strength of an electrostatic field directed normally to the layer. The present invention includes any light-reflecting, preferably light-transmitting material or article incorporating at least one light-reflecting, preferably light-transmitting layer the light-reflecting property of which can be reversibly modified by subjecting such layer to the influence of at least one electrostatic field directed normally to such layer and by varying the strength of this field, at least one electrode, and means for connecting parts of such material or article, including the electrode(s), to a source of E.M.F. to establish the electrostatic field.

Light-reflecting layers with the required properties can be formed by various semiconductors. Some semiconductors when formed into a thin layer reflect light to an extent which is normally quite small but which increases considerably when an electrostatic field is imposed normally to the layer.

Preferred semiconductors are selected from elements of Group IV of the Periodic Table according to Mendeleeff and from compounds of elements of Groups V or VI with elements of Groups II or III of such table. Light-reflecting semiconductor layers preferably inculde impurities belonging to the group: Se, Te, As, Sb, B, Cl, In P, Zn, and Cd, since the presence of such impurities sometimes considerably increases the influence of the electric field upon the light-reflecting property of the layer.

Light-reflecting layers with the required properties can also be formed from various metals. Actually, the intrinsic reflection coefficient of thin layers of metals is normally higher than layers of semiconductors, so that the proportional change in the light reflectance due to the influence of an electrostatic field is not so great. However, even small changes in the proportion of incident light reflected from a metal layer, e.g., a thin layer of gold, can be detected by sensitive optical instruments and a material or article according to the invention can be employed in this way for measuring the intensity of an electric field.

Additional objects and advantages of the present invention will become apparent upon consideration of the following description when taken in conjunction with the accompanying drawings in which.

Figure 1:
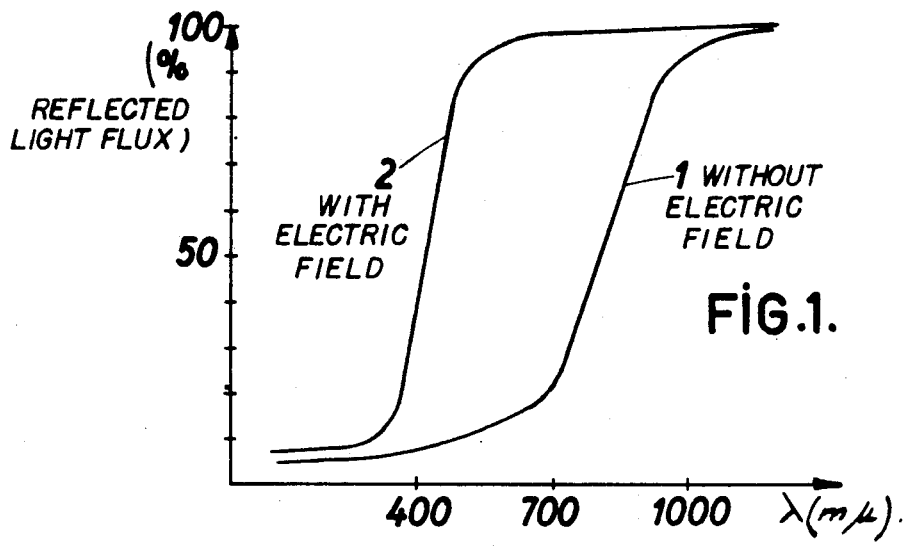
FIG. 1 is a graph showing how the reflection of light by a glazing unit is influenced by an electrostatic field.

With more particular reference to the drawings, the graph constituting FIG. 1 relates to a film of pure tin oxide ($SnO_2$), 200 angstroms thick, deposited on a 3 mm. thick glass sheet by vacuum evaporation. The ordinate of the graph represents the percentage of the reflected light flux and the abscissa represents the wavelengths of the light falling upon the film. The curve 1 indicates the light reflectance when the film is not subjected to an electric field. The curve 2 shows the light reflectance when the film is subjected to an electric field of 50 volts/micron perpendicular to the surface of the film.

In the absence of the electric field (curve 1) the film transmits nearly all visible radiation with wavelengths below 700 millimicrons, but reflects most of the infrared radiation, particularly that having a wavelength which exceeds 1,000 millimicrons.

On the other hand the curve 2 shows that the same tin oxide film, when subjected to an electric field, reflects practically all the visible radiation. All reflection curves corresponding to values of the electric field strength ranging from 0 to 50 volts/micron are similar to the curves 1 and 2, but are situated between them.

It is well known that the light flux reflected by a layer increases with the thickness of the layer. If, for instance, a tin oxide film ten times thicker had been used in the above example, the light flux reflected by the film in the absence of an electric field would have been noticeably greater than that represented by curve 1. The light reflecting power of a glazing unit according to the invention therefore depends in part on the thickness of the light-reflecting layer.

If the tin oxide layer used in the above example is replaced by a tin oxide layer containing traces of impurity, e.g., selenium, in a proportion of $9.5 \times 10^{20}$ atoms per square cm. (which is tantamount to replacing 6% of the tin atoms by selenium) the intrinsic reflective power of the tin oxide layer is increased so that an electric field of lower strength suffices for raising the light reflectance to a given value.

Figure 2:
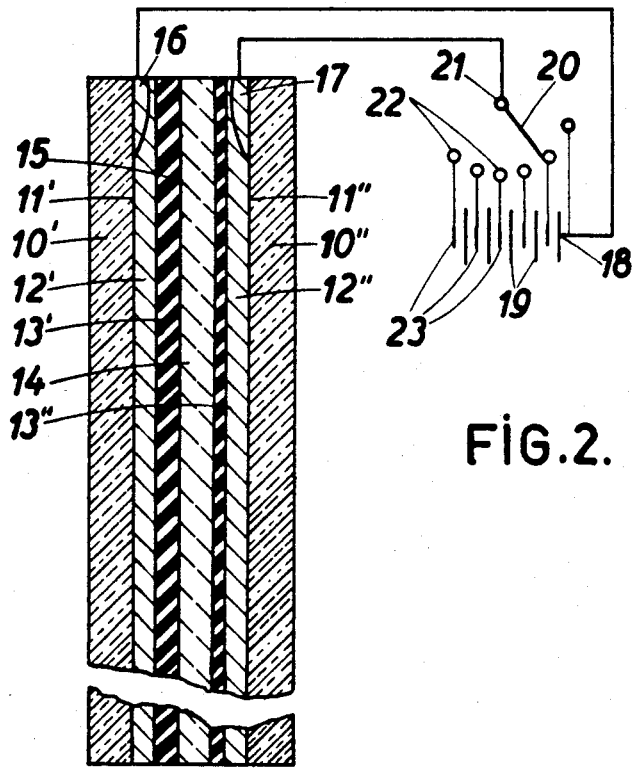
FIG. 2 is a diagrammatic sectional view of one embodiment of the present invention.
Figure 3:
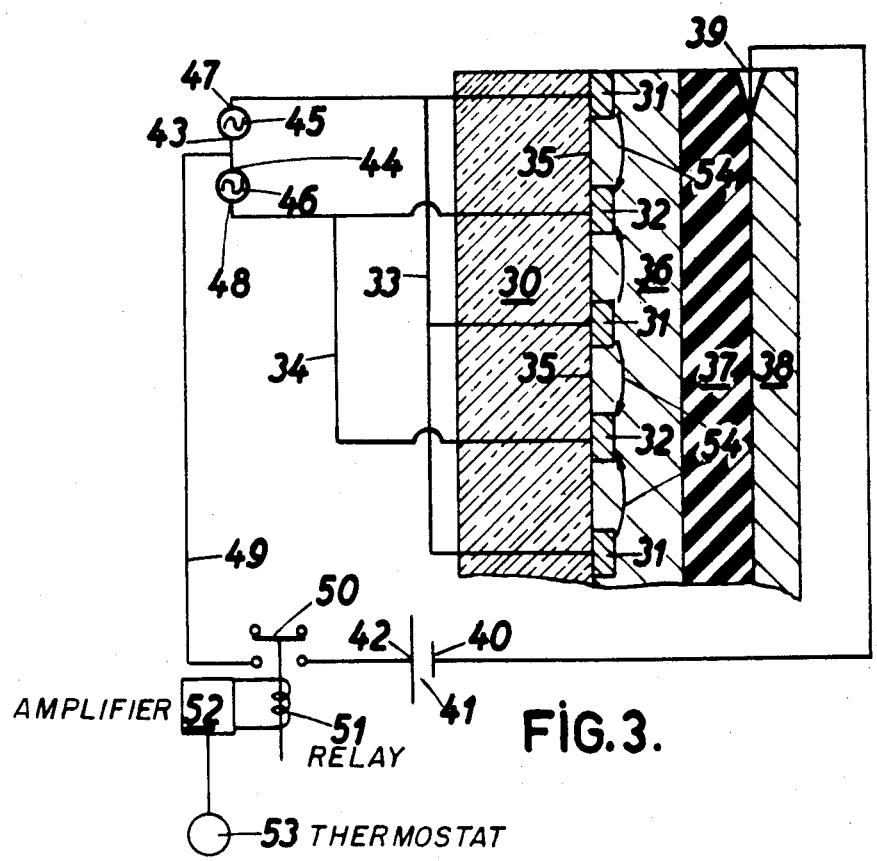
FIG. 3 is a diagrammatic sectional view of another embodiment of the invention.
Figure 4:
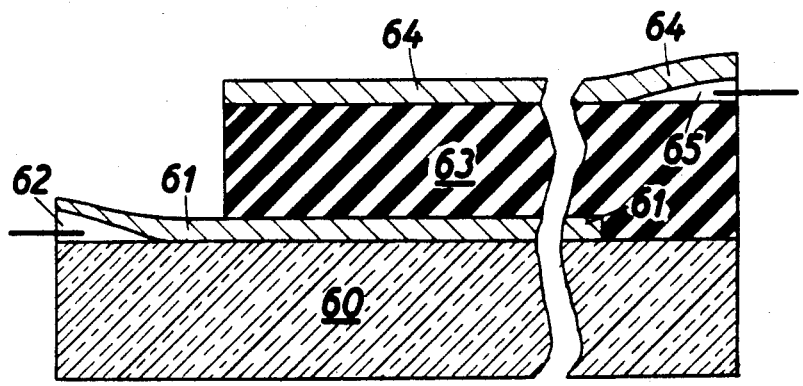
FIG. 4 is a diagrammatic sectional view of still a further embodiment.

FIG. 2 shows a glazing unit constructed in accordance with the invention and comprising outer stiffening sheets 10' and 10" made of sheet glass 3 mm. thick. The inner faces 11' and 11" of these sheets are covered by silver films 12' and 12", each 100 angstroms thick and deposited by vacuum evaporation. It should be noted that FIGS. 2, 3 and 4 are not drawn to correct proportion for purposes of simplicity. An SiO layer 13', 2 microns thick, is deposited on the film 12' and an SiO layer 13", 200 millimicrons thick, is deposited on the film 12". The layer 13" is covered with an $SnO_2$ layer 14 which is 3 microns thick and contains selenium in a proportion of 1% with respect to the tin atoms. The SiO layer 13' and the $SnO_2$ layer 14 are placed face to face in plane 15. Electrodes 16 and 17, made of alloyed copper (which may be deposited by well known processes) are respectively connected to a pole 18 of a D.C. voltage source 19 and to a contact arm 20 which can swing about the pivot 21 so as to touch one of the terminals 22 on the poles 23 of the voltage source 19, which poles are at different potentials.

The $SnO_2$ layer 14, containing traces of selenium reflects light to a degree which depends on the strength of the electric field perpendicular to the plane 15. This electric field is generated between the silver films 12' and 12" by virtue of the connection of the electrodes 16 and 17 to the voltage source 19. The insulating layers 13' and 13" prevent the passage of electric current between the films 12' and 12" through the semiconductor layer 14, so that the glazing unit does not consume electric energy.

The glass sheets 10' and 10" impart rigidity to the unit and protect the layers 12', 13', 14 and 12", 13" against damage from physical and chemical causes.

When the arm 20 is in contact with the extreme right-hand terminal 22, no potential is applied to the electrodes 16, 17 and no electric field is generated so that the reflective power of the glazing unit is the sum of the intrinsic reflective powers of the silver films 12' and 12", the insulating films 13' and 13" and the semiconductor layer 14. As arm 20 is moved to the left the voltage between the electrodes 16 and 17 and the strength of the electric field between the films 12' and 12" increases so that the $SnO_2$ layer 14 reflects progressively more light, first in the infrared band of the spectrum and then in the visible light band. The change in the reflectance follows a pattern similar to that represented by the graph forming FIG. 1.

The glazing unit according to FIG. 2 is very efficient, the light reflection is immediately and reversibly modified by changes in the electric field strength.

The glazing unit shown in FIG. 3 comprises a glass sheet 30 bearing current-conducting copper strips 31 and 32, disposed in spaced parallel relation and extending over the length of the sheet 30 measured perpendicular to the plane of the drawing. The width of the strips is 1 cm. and the distance between two neighboring strips is 5 cm. These strips are 100 angstroms thick. The strips 31 are electrically connected to each other along one edge of the glass sheet 30 by a connection diagrammatically represented by the line 33, whereas the strips 32 are connected together along the other edge of the sheet 30 by a similar connection 34.

A layer 36 of cadmium sulphide is applied over the face 35 of the glass sheet 30 so as to cover the strips 31 and 32. The thickness of the layer 36 of cadmium sulphide, which is a semiconductor, is 2500 angstroms. An SiO insulating layer 37, 150 angstroms thick and a silver film 38, 100 angstroms thick are applied in succession over layer 36. A silver electrode 39 is deposited along one edge of the unit between layers 37 and 38. This electrode 39 is connected to the positive pole 40 of a D.C. voltage source 41 giving a continuous output voltage of 20 volts. The negative pole 42 is electrically connected to the terminals 43 and 44 of two alternating current sources 45 and 46 (output 2 volts) and the terminals 47 and 48 of these sources are respectively connected to the lines 33 and 43. The conductor 49 between the negative pole 42 and the alternating current sources 45 and 46 is interrupted by a switch 50, shown in the "off" position. This switch is controlled by a relay 51 excited by signals from an amplifier 52 which is in turn controlled by a thermostat 53.

The potential differences maintained between the strips 31 and 32 by the A.C. sources 45 and 46 generate currents inside the layer 36 of cadmium sulphide substantially parallel with the face 35 of the glass sheet 30. The directions of these currents are indicated by the arrows 54 and the currents are in phase with the A.C. generators 47, 48.

When the thermostat 53 is closed by a heat source, the switch 50 closes the circuit comprising the glazing unit and the direct voltage source 41 so that a potential difference is established between the copper strips 31 and 32 on one hand and the silver film 38 on the other hand. Consequently an electric field or electric fields perpendicular to the faces of the glass sheet 30 is or are simultaneously generated between the strips and the layer. The strength of such electric field(s) is sufficient for increasing the reflective power of the layer 36 of cadmium sulphide. The effect of the current 54 is to keep the increase of the reflected light flux in constant relationship to the strength of the electric field between the strips 31, 32 on the one hand and layer 38 on the other hand, over the working life of the unit. The electric power required for generating such currents does not exceeds 5 watts.

The cadmium sulphide layer 36 could be replaced by a layer of another material such as zinc selenide, cadmium telluride or a silicium-germanium alloy.

The glazing unit shown in FIG. 4 comprises a layer of gold 61 deposited on a glass sheet 60 and fitted locally with an electrode 62. The gold layer is 50 angstroms thick. An insulating layer 63 of SiO which is 250 angstroms thick covers the gold layer 61 and a layer of gold 64 which is 200 angstroms thick covers the layer 63 and is fitted locally with an electrode 65. The electrodes 62 and 65 are respectively connected to the positive and negative poles (not shown) of a D.C. voltage source (not shown) of which the voltage output can be varied between zero and 5 volts.

In the absence of the electric field the glazing unit formed by the layers 60, 61, 63 and 64 absorbs light radiation only to a slight extent and the reflective power of the unit is practically equal to zero within the visible part of the light spectrum. When a potential is applied to the electrode 62 and 65, an electric field perpendicular to the glazing unit, is generated between the gold layers 61 and 64, and this electric field influences the light-reflecting power of these gold layers. When the field potential is 5 volts, the gold layers 61 and 64 taken together reflect nearly 50% of the visible light falling on the unit.

If a reversing switch is incorporated in the circuit, between the electrodes 62 and 65, the direction of the electric field can be reversed. When the field direction is opposite to that which increases the light-reflecting power of the gold layers as above described, their light reflecting power is less than it is when no electric field is present.

For continually varying the light flux reflected by the unit, a circuit including an A.C. generator, an autotransformer, and a rectifier can be used.

Various examples of suitable light-reflecting layers for use in carrying out the invention have been mentioned above and will be mentioned hereafter. It is to be noted that these layers are very transparent, and they are easily formed and are not expensive. On this account alone, they offer important advantages over layers of glass and plastics materials containing crystals or crystallites as hereinbefore referred to. In addition, however, the light-reflecting layers of the present invention afford the important advantage that the modification of the light-reflecting property due to the influence of an electrostatic field is substantially instantaneously reversible by appropriately modifying the strength of this field. In the case of light-reflecting layers with crystalline inclusions or comprising photochromic or thermochromic substances, the reversal of the changes in light reflectance brought about by temporary changes in the intensity of incident radiation or in the ambient temperature conditions sometimes occurs only after some delay. In some cases the reversal fails to take place after a certain period of use due to fatigue of the material.

The electrostatic field may be continuous or intermittent and it may be unidirectional or reversible or alternating. Thus, by way of example, a D.C. voltage source may be used for generating a continuous unidirectional field, the strength of which can be varied by varying the E.M.F. If desired, means may be provided for readily changing the field direction because in some cases the imposition of an electric field in one of the two possible directions causes the article or material to reflect less light coming from a given direction than would be reflected in the absence of an electric field. This phenomenon may be utilized, e.g., in a glazing unit by reversing the field direction towards the end of a sunny day so that the amount of sunlight reflected becomes lower than normal. As an alternative an A.C. voltage source, e.g., of a kind capable of generating a sinusoidal current, may be used for establishing an alternating field, or it may be used in combination with a rectifier (which may, e.g., rectify alternate voltage waves and yield a continuous D.C. voltage or suppress alternate voltage waves to yield an intermittent D.C. voltage) for generating a unidirectional field. This latter expedient may be adopted, e.g., if it is desired to establish a unidirectional field and no D.C. voltage source is available. The strength of a unidirectional field established by means of a rectified A.C. voltage will be approximately proportional to the mean voltage. However, it is not essential, at least in most cases, to rectify an A.C. voltage, since the light reflecting property can be modified by imposing a sinusoidal alternating electrostatic field. It might perhaps be expected that the net effect of such a field on the light reflectance would be nil, but in general this is not so since the response of a light reflecting layer to an alternating electrostatic field of a given strength is not necessarily symmetrical so that the increases and decreases of the reflectance with respect to a notional norm may be unequal. In general, when employing an alternating field, a frequency of 50 c./s. is ample for avoiding any scintillation effect.

The phenomenon made use of by the invention that the light-reflecting property of certain light-transmitting layers can be reversibly modified is not only evident with visible light. In some cases, depending mainly on the composition of the light-reflecting layer and the intensity of the electrostatic field, the existence of the electrostatic field influences the reflectance of light in the infrared and/or ultraviolet region of the light spectrum. Thus, by appropriate choice of the layer composition and electric field strength the reflectance of incident infrared rays can be reversibly modified while leaving unchanged the amount of visible light transmitted.

The electric field may be established across the light-reflecting layer between electrodes disposed on opposite sides thereof. Alternatively the light-reflecting layer may embody one or more electrodes or (if such layer is sufficiently electrically conductive) it may actually form an electrode, and the electric field may be established between such electrode(s) and one or more further electrodes located on one or each side of such light-reflecting layer so that the electrostatic field extends to one or each surface of such layer. From this it will be clear that it is not essential for an electric field actually to traverse the light-reflecting layer.

At least one electrode may be formed by a thin electrically conductive layer or semiconductive layer extending parallel with the light-reflecting layer and covering a similar area to that layer. Any such electrode-forming layer must be a light-transmitting layer, save in special modified embodiments of the invention hereinafter referred to in which the transmission of light by the material or article in question is not essential. A suitable conductive layer is a metallic sheet or foil sufficiently thin to be transparent, and particularly a thin metal coating layer formed on transparent supports by electrolysis, vacuum deposition or some other technique. To facilitate its connection to a voltage source, such a layer may be edged with metal strips or a conductive wire may be embedded in such layer or otherwise connected thereto. As the layer does not have to conduct electric current but has merely to be raised to a certain potential, it need not be a very good conductor.

A material or article according to the invention may e.g., comprise as electrodes two such electrically conductive layers located on opposite sides of the light-reflecting layer. The material or article can be made quite thin. Clearly the smaller the inter-electrode spacing, the lower is the E.M.F. required to establish the required electrostatic field. On the other hand a light-transmitting insulating layer may, if required, be present between the light-reflecting layer and at least one parallel electrode. Such an insulating layer may be present on one or each side of the light-reflecting layer. The insulating layer may be an air layer or it may be a solid layer in contact with the light-reflecting layer or spaced therefrom, in which case the space may be occupied by air or by another gas or a liquid with good electrical conductivity. Suitable materials for forming solid transparent electrically insulating layers, are, e.g., plastic materials and various oxides such as SiO, $SiO_2$, $Al_2O_3$, $ZrO_2$, $CeO_2$, $B_2O_3$ and combinations thereof. Layers formed from these materials can be perfectly transparent. The layers may be thin or thick and have great dielectric rigidity so that they are suitable for forming layers capable of withstanding an intense electric field of the order of several thousand volts per millimeter without being punctured.

A material or article according to the present invention may be constructed so that one or more electric currents can be caused to flow along the light-reflecting layer. It has been found that electric current flow along the light-reflecting layer counters or reduces any tendency for the influence of the electrostatic field to weaken in the course of time. This tendency has not been observed in all cases, but when it occurs it is necessary for the electric field strength to be increased if its effect is to be maintained. The precise timing and extent of such increase can not be predetermined since the weakening of the effect of the electric field does not follow a law which can be easily determined. In any case, this problem can be solved by causing electric current flow along the light-reflecting layer. For this purpose, opposed edges of the layer may be connected to an electric current source. As an alternative, electrically conductive strips may extend along the light-reflecting layer in one direction and the successive strips may be connected to the positive and negative poles of a current source alternately so that when the material or article is in use there is a flow of current along the light-reflecting layer between each pair of neighboring strips. It has been ascertained that the advantageous influence of electric current flow along the light-reflecting layer is not due to heating of the layer by the electric current or currents since a similar effect is achieved if the temperature of the material or article is prevented from rising by artificial cooling.

One or more insulating sheets may serve as stiffening or strengthening elements in a material or article according to the invention or may in fact be solely responsible for giving the material or article rigidity if the other layers are too thin to contribute to mechanical strength. An advantageous construction of glazing unit is, for example, one in which the light-reflecting layer and the electrode or electrodes and any intervening insulating layers are sandwiched between two outer insulating sheets. The insulating sheets then additionally serve to protect the inner layers from damage by scratching or by dust particles, and from chemical attack by smoke, fumes or vapor and the unit can be washed without impairing it.

Suitable materials for forming transparent insulating sheets are glasses and polymeric materials, e.g., acrylic resins having good light-transmitting properties and good chemical resistance.

In the foregoing description, reference has been more particularly made to materials or articles comprising a single light-reflecting layer. In many cases it will be desired to form the material or article from as few layers as possible, and if desired two layers can be made to serve, i.e., a light-reflecting layer serving as an electrode and a parallel layer serving as a second electrode sufficiently insulated from the light-reflecting layer to permit the required electrostatic field to be established normally to such layer. However, it is to be understood that a material or article according to the invention may comprise more than one light-reflecting layer and each of these may be exposed in use to the influence of an electrostatic field. The different layers reversibly reflecting light to a variable extent may be selected as to their compositions so as to achieve additional optical effects, e.g., as regards coloration, degree of transparency, or dullness. Moreover, in a material or article according to the invention, one or more light-reflecting layers may be combined with other parallel layers of a composition or compositions chosen to confer special optical or mechanical properties on the material or article.

The invention includes materials and articles as herein defined and incorporating or combined with one or more components capable of influencing a voltage potential responsive to fluctuations in heat and/or light energy so that in use the strength of the electric field to which the light-reflecting layer or layers is or are subjected is controlled automatically in dependence on prevailing conditions of light and/or temperature. For example, a glazing unit according to the invention may be connected to a source of E.M.F. coupled with a thermostat or photoelectric cell which can be installed adjacent the glazing unit so as to be exposed to the conditions which should determine the extent to which the unit is caused to reflect incident light. The thermostat or photoelectric cell or other component or components responsive to light and/or heat energy may be coupled to the system by an amplifier which transmits amplified signals for modifying the electrical potential which controls the electrostatic field strength and thereby the light flux reflected in the infrared, visible and/or ultraviolet bands of the light spectrum.

A material or article according to the invention may be coupled with a programming device for automatically varying the strength of the electric field influencing the light-reflecting layer, in the course of time according to a predetermined schedule. Such a programmer can be one arranged to vary the electric field strength in a continuous or modulating manner or discontinuously. In this way a glazing unit according to the invention can be automatically adjusted to changes in preventing sunlight intensity forecast for the course of a day. Also in suitable cases the programmer can be set so that the reflecting power of the unit with respect to the light flux incident on the inside of the glazing unit is brought to a maximum at a predetermined time in the course of the evening so that the interior of an artificially lighted room is not visible through the unit.

In the course of the foregoing description, reference has been made to the possibility of using a material or article according to the invention (as hereinbefore defined) for measuring the intensity of an electric field. This possibility exists because the intensity of the electric field, to which the light reflecting layer is subjected, determines the proportion of incident light which is reflected and the flux of reflected light can therefore be used as a measure of the electric field strength. If the object is merely to register or measure the strength of an electric field in this way then the light-transmitting property of the light-reflecting layer is superfluous. The same object can be achieved by employing a material or article which does not transmit light but which incorporates at least one layer whose light-reflecting property can be reversibly modified by subjecting such layer to the influence of at least one electrostatic field directed normally to such layer and varying the strength of such field. Accordingly the present invention includes, by way of modification of the invention as hereinbefore defined, any such non-light-transmitting material or article in combination or association with means for registering or measuring the flux of light reflected from the material or article. The material or article may also incorporate at least one electrode, and means for connecting parts of such material or article, including such electrode(s) to a source of E.M.F. for applying an electric field.

The invention also includes any method as above referred to of registering or measuring the strength of an electric field.

In these embodiments of the invention the opacity of the material or article may be due either to opacity of the layer with the variable light-reflecting property or to the combination of a light-transmitting layer having the required variable light-reflecting property with an opaque layer or layers.

Other semi-conducting materials which may be used for the light-reflecting layer are: Ga As, Ga Sb, In As, In Sb, Zn Te, Cd Se, Hg Se, Hg Te, Zn S.

Besides gold, the following metals and metal-compounds can also be used for the light-reflecting layer: Ag, Cu, Pt, Pd, Cu Ni, Au Hg, Au Cd, Au Bi, Au Tl, Au Sn, Au In.

It will be understood that the above description of the present invention is susceptible to various modifications, changes, and adaptations and the same are intended to be comprehended within the meaning and range of equivalents of the appended claims.

What is claimed is:

1. A light-reflecting article, comprising, in combination:
   at least one thin variable light-reflecting, electron conducting solid layer whose light-reflecting property can be reversibly modified by subjecting such variable layer to the influence of at least one electrostatic field directed normally to such layer;
   two electrodes disposed for enabling a voltage between them to produce such a field influencing said layer;
   E.M.F. source means connected between said electrodes for establishing the electrostatic field;
   means for varying the strength of the field for varying the light-reflectance of said layer; and
   an electrically insulating layer disposed between said electrodes for electrically insulating them from one another.

2. An article as defined in claim 1 wherein said variable layer forms one of said electrodes.

3. An article as defined in claim 1 further comprising at least one electrically insulating sheet united with said variable layer for at least partially strengthening and rigidifying said variable layer.

4. An article as defined in claim 3 wherein there are two insulating sheets provided on the outer surfaces of said variable layer as protective sheets on each side thereof.

5. An article as defined in claim 3 wherein said insulating sheet is formed of glass or a polymeric material.

6. An article as defined in claim 1 which further includes at least one self-supporting sheet of light-transmitting material whereby said article and said sheet comprise a glazing unit.

7. A controllable light-reflecting device, comprising, in combination:
   a substrate;
   a light-reflecting electron conducting coating on said substrate and acting as a control layer;
   two electrodes associated with said control layer so that a voltage between said electrodes influences said layer;
   means for connecting said electrode to a source of E.M.F. for establishing a variable electric field with lines of force extending substantially normal to the control layer, said control layer reflecting incident light to an extent which depends on the strength of such electric field; and
   an electrically insulating layer disposed between said electrodes.

8. A device as defined in claim 7 wherein said variable layer includes an element of Group IV or a compound of an element of Groups V or VI with an element of Groups II or III of the Mendeleeff Periodic Table.

9. A device as defined in claim 8 wherein said material forming the variable layer includes an impurity selected from the group consisting of Se, Te, As, Sb, B, Cl, In, P, Zn and Cd.

10. A device as defined in claim 7 wherein each said electrode is a light-transmitting layer.

11. An article as defined in claim 7 wherein said electrically insulating layer is formed from a material selected from plastics, air, and at least one of the following oxides: SiO, $SiO_2$, $Al_2O_3$, $ZrO_2$, $CeO_2$, $B_2O_3$.

12. A device as defined in claim 7 wherein one of said layers of the article is opaque so that the material does not transmit light.

13. A device as defined in claim 7, further comprising a source of E.M.F., and wherein said control layer is disposed between said electrodes, and said connecting means is connected to said source of E.M.F. to maintain an electric potential between said electrodes.

14. A device as defined in claim 13 wherein said electrodes are light-transmitting layers.

15. A device as defined in claim 7 wherein said control layer includes one of said electrodes.

16. A device as defined in claim 7 wherein said substrate is of glass or polymeric material.

References Cited

UNITED STATES PATENTS

| 2,632,045 | 3/1953 | Sziklai | 178—5.4 |
| 3,153,113 | 10/1964 | Flanagan et al. | 88—61 |
| 3,242,805 | 3/1966 | Harrick | 88—61 |
| 3,280,701 | 10/1966 | Donnelly et al. | 88—77 |

FOREIGN PATENTS

| 1,334,630 | 7/1963 | France. |

RONALD L. WIBERT, Primary Examiner

P. K. GODWIN, Jr., Assistant Examiner

U.S. Cl. X.R.

350—290